United States Patent [19]

Olschewski et al.

[11] Patent Number: 4,637,740
[45] Date of Patent: Jan. 20, 1987

[54] BEARING BUSHING FOR UNIVERSAL JOINTS

[75] Inventors: Armin Olschewski, Schweinfurt; Bernhard Bauer, Hassfurt; Elisabeth Zirk, Dittelbrunn; Rut Heemskerk, Pfandhausen, all of Fed. Rep. of Germany

[73] Assignee: SKF GmbH Schweinfurt, Schweinfurt, Fed. Rep. of Germany

[21] Appl. No.: 787,807

[22] Filed: Oct. 16, 1985

[30] Foreign Application Priority Data

Oct. 20, 1984 [DE] Fed. Rep. of Germany ... 8430909[U]

[51] Int. Cl.$^4$ .......................... F16C 17/08; F16D 3/20
[52] U.S. Cl. ...................................... 384/425; 464/132
[58] Field of Search ............... 384/452, 454, 455, 548, 384/564, 569, 425, 427, 590; 464/14, 128, 132

[56] References Cited

U.S. PATENT DOCUMENTS

| 3,635,535 | 1/1972 | Schultenkämper | 464/132 X |
| 3,786,289 | 1/1974 | Baclawski et al. | 384/425 X |
| 4,050,130 | 9/1977 | Pitner | 464/128 X |
| 4,130,325 | 12/1978 | Schultenkämper | 384/425 |

FOREIGN PATENT DOCUMENTS 2616020 10/1977 Fed. Rep. of Germany ...... 384/425

Primary Examiner—Stuart S. Levy
Assistant Examiner—Thomas R. Hannon
Attorney, Agent, or Firm—Eugene E. Renz, Jr.

[57] ABSTRACT

For a bearing bushing of generally cup-like form for universal joints including a universal joint pin, a check plate disposed between the axial end face of the pin and the bottom wall of the bushing, said check plate having on the side thereof confronting the pin concentric or circumferentially distributed projections with check surfaces and in that, proceeding from the end surface facing away from the pin, it has recesses or the like, which are arranged under the projections in the axial direction.

3 Claims, 5 Drawing Figures

BEARING BUSHING FOR UNIVERSAL JOINTS

FIELD OF THE INVENTION

The present invention relates to bearing bushings particularly adapted for universal joints. The bearing bushing is characterized by novel features of construction and arrangement providing a certain elasticity of the parts of the universal joint in an axial direction.

BACKGROUND OF THE INVENTION

Bearing bushings for universal joints are not new per se. For example, West German Utility Pat. No. 7,302,217 shows a bearing bushing having a so-called check plate with a centrally disposed circular or ring-shaped contact surface projecting out toward the pin and which has near its edge a support surface which is set back with respect to the central contact surface. This known design presents several disadvantages and drawbacks. For example, since the contact surfaces are very small and because the plate is pushed down or displaced completely even under very small axial forces and abuts on the bottom of the bearing bushing, it can only absorb relatively small axial forces.

SUMMARY OF THE INVENTION

With the foregoing in mind, it is an object of the present invention to provide a bearing bushing characterized by novel features of construction and arrangement which is capable of elastically absorbing relatively large axial forces and is of a relatively compact design in an axial direction. To this end in accordance with the present invention, the face of the check plate confronting the universal joint pin is provided with a series of concentric or circumferentially oriented projections and includes a number of recesses or channels extending from the end surface facing away from the pin and which are located so as to be under the projections in the axial direction. By this configuration, the check plate functions as a spring so that when the bearing bushings are pressed into place in the bores of the universal joint forks, tolerances are compensated for and during operation comparatively large axial forces are elastically absorbed.

In accordance with another feature of the present invention, the recesses or channels are arranged to open out into the check surfaces of the plates and are connected to lubricating ports to facilitate lubrication of the contact surfaces.

Thus, it is the task of the present invention to provide a check plate configuration designed in such a way that when the bearing bushing is pressed into the base of the universal joint fork, tolerances are compensated for and axial forces which the pin exerts on the check plate during operation are elastically absorbed. To this end, the check plate is provided with projections on one end face confronting the pin. These projections have elastic properties by virtue of the corresponding recesses on the opposite end face of the check plate.

DESCRIPTION OF THE DRAWINGS

These and other objects of the present invention and the various features and details of the operation and construction thereof are hereinafter more fully set forth with reference to the accompanying drawings, wherein.

DESCRIPTION OF THE PREFERRED EMBODIMENTS

Figure 1:
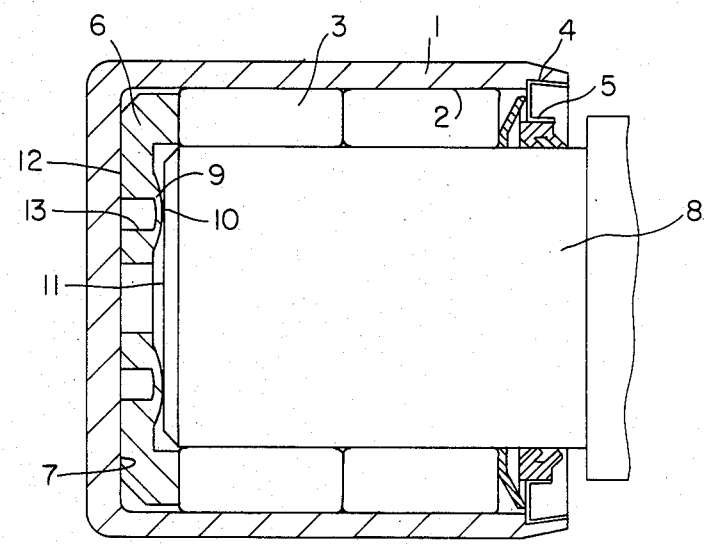
FIG. 1 is a longitudinal section through a bearing bushing with a check plate constructed in accordance with the present invention.

Referring now to the drawings and particularly to FIG. 1 thereof, there is illustrated a bearing bushing made of sheet metal generally referenced by the numeral 1 having a bore 2 formed the raceway for two rows of cylindrical rollers 3. The rollers 3 are pressed axially against a check plate 6 by a plate spring 4 inserted between a sealing ring 5 and the outer row of rollers. As illustrated, check plate 6 bears against the interior face of the bottom wall 7 of the bearing bushing 1.

In accordance with the present invention, check plate 6 is provided with a series of circumferentially spaced projections which confront the axial end face of the universal joint pin 8. The projections as illustrated are dome-shaped that have an outer spherical surface 10 which bears against the axial end face 11 of pin 8. As illustrated, the check plate is provided with a series of axially extending bores 13 extending from the back face 12 of the check plate which contacts the bottom wall of the bearing bushing. The ports are aligned with the projections 9 and extend to a point so that they define a resilient dome-shaped diaphragm and function like a spring in the axial direction.

Figure 2:
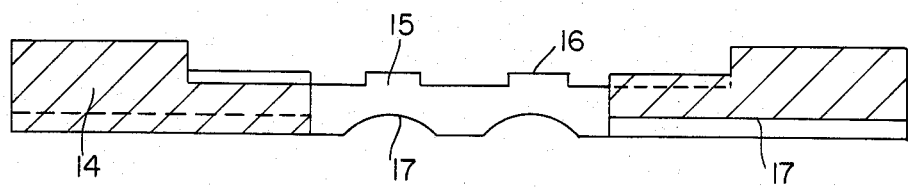
FIG. 2 is an enlarged sectional view taken on lines A-B of FIG. 3.
Figure 3:
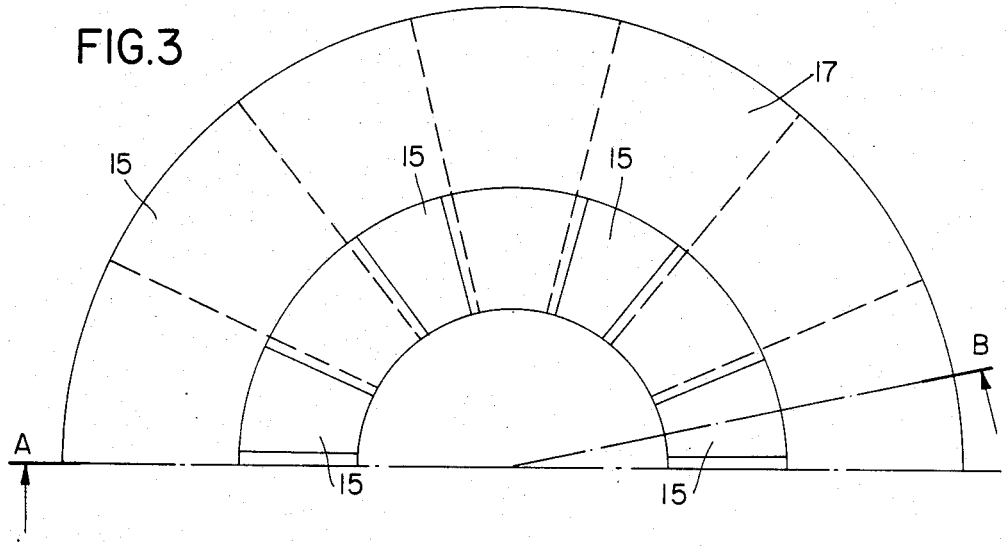
FIG. 3 is a top plan view of the check plate shown in FIG. 2.

There is illustrated in FIGS. 2 and 3 a modified form of check plate in accordance with the present invention. In this instance, the face of the check plate confronting the universal joint pin is provided with several circumferentially distributed radially oriented projections 15 in the form of raised ribs which define relatively flat planar check surfaces 16. The back face of the check plate has a series of radially oriented grooves 17 which underlie the projections 15 whereby the plate can yield elastically under axial load.

Figure 4:
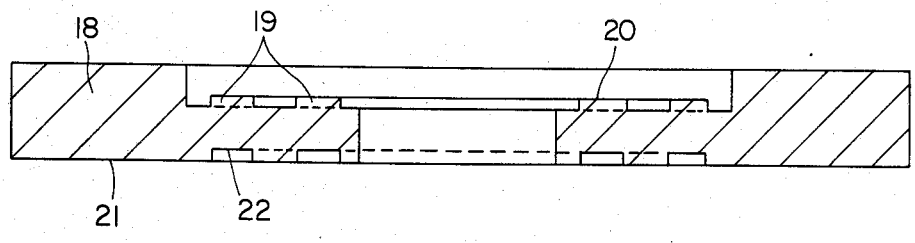
FIGS. 4 and 5 show additional embodiments of check plates made in accordance with the present invention.

Still a further modification of the present invention is shown in FIG. 4 wherein the outer face of the check plate confronting the universal joint pin has two concentrically arranged circumferentially extending projections 19 having as illustrated flat planar check surfaces 20 engaging the universal joint pin outboard of the central axis thereof. Circumferentially extending recesses are provided in the back face of the check plate which are aligned in an axial plane with the projections 19. This arrangement likewise permits the projections to yield elastically in an axial direction under load.

Figure 5:
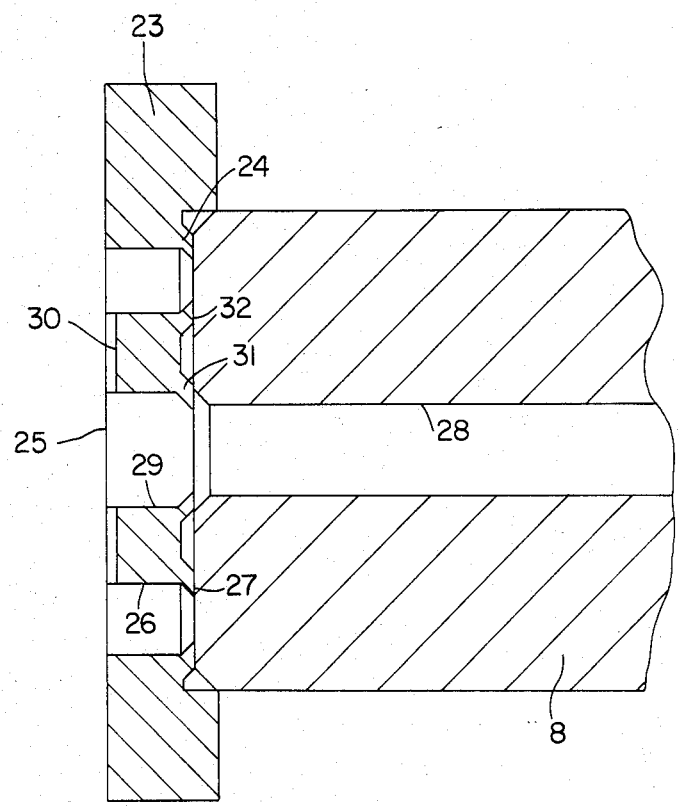

FIG. 5 shows still another form of check plate in accordance with the present invention. In this instance, the check plate is provided with a series of circumferentially spaced through holes 26 which at the outer face converge to define a circumferentially extending lip defining check surfaces 27 which is capable of yielding elastically in the axial direction. In this instance, the pin 8 is provided with an axial bore 28 for supplying lubricant through an orifice 29 in the check plate aligned with the bore 28 grooves 30 and holes 26 in check plate 23 to check surfaces 27. Check plate 23, as illustrated, is also provided with a concentric, circumferentially extending elastic edge 31 having a ring-shaped check surface 32.

Even though particular embodiments of the present invention have been illustrated and described herein, it is not intended to limit the invention and changes and modifications may be made therein within the scope of the following claims.

We claim:

1. For a bearing bushing of generally cup-like form for universal joints including a universal joint pin, a disk-like check plate having opposing side faces disposed between an axial end face of the pin and a bottom wall of the bushing, a plurality of spaced discrete projections extending outwardly from one side face of said check plate confronting the pin, said projections arranged in a generally circular array and being circumferentially spaced relative to one another, a plurality of recesses extending inwardly from the other face of said check plate aligned with said projections extending inwardly a predetermined distance to define a thin-walled flexible dome-shaped projection, the wall thickness of the check plate surrounding and adjacent said projections being substantially greater than said dome-shaped projections.

2. For a bearing bushing according to claim 1, characterized in that the projections (9) of the check plate (6) have a spherical surface (10).

3. For a bearing bushing of generally cup-like form for universal joints including a universal joint pin, a disk-like check plate having opposing side faces disposed between an axial end face of the pin and a bottom wall of the bushing, a plurality of spaced discrete projections extending outwardly from one side face of said check plate confronting the pin, said projections arranged in a generally circular array and being circumferentially spaced relative to one another, a plurality of recesses extending inwardly from the other face of said check plate aligned with said projections extending inwardly a predetermined distance to define inwardly converging flexible lips, means defining an orifice adjacent the center of the check plate which aligns with an axial bore in the pin and means defining grooves in the other face of said check plate connecting said orifice and each of said recesses thereby to provide for a means for lubricating the check surfaces defined by the inwardly converging flexible lips which extend from one face of said check plate around each of said recesses.

* * * * *